Feb. 18, 1964  L. L. FOWLER  3,121,683
MAGNETIC SEPARATOR AND CONVEYOR
Filed Sept. 18, 1958
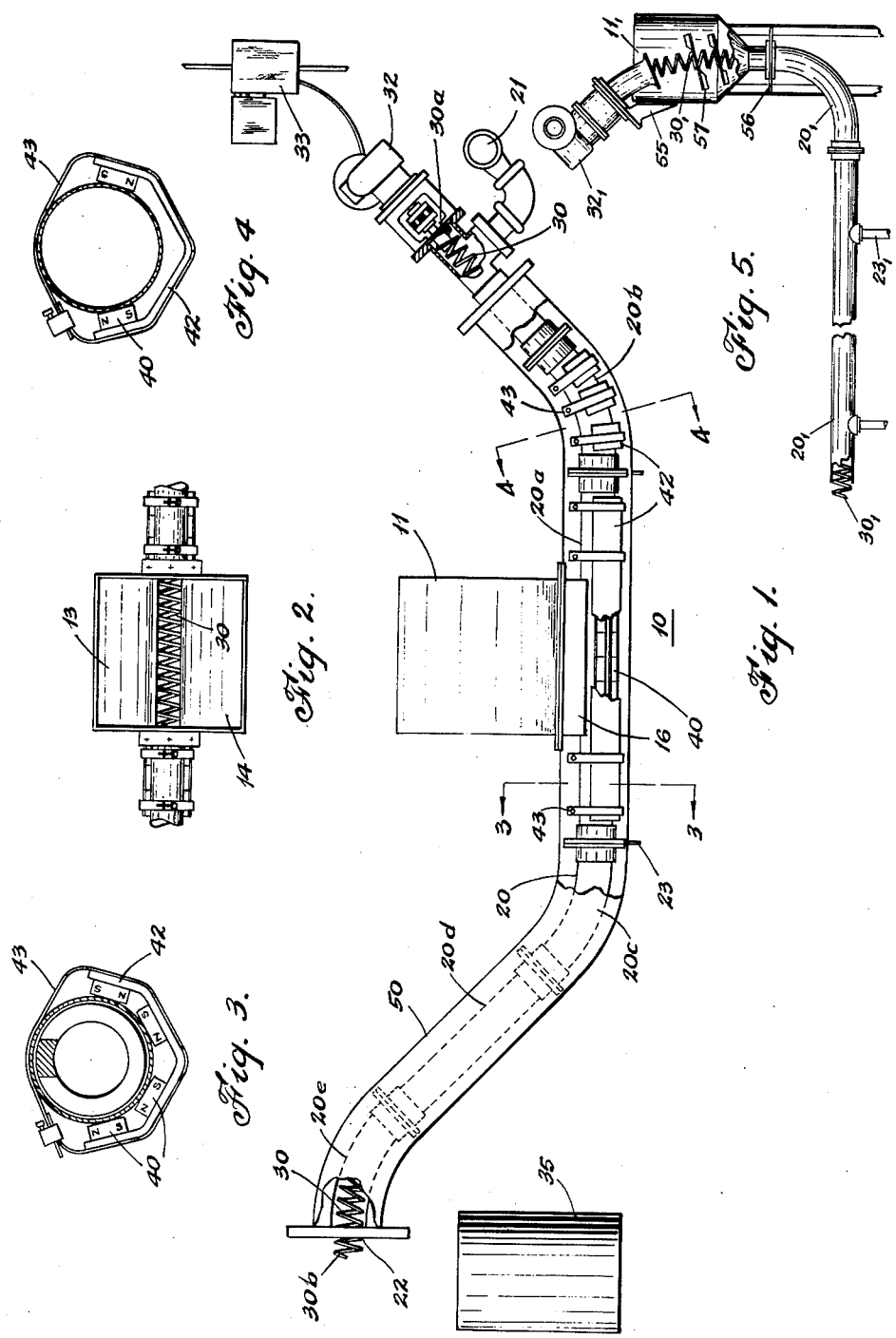

United States Patent Office 3,121,683
Patented Feb. 18, 1964

3,121,683
MAGNETIC SEPARATOR AND CONVEYOR
Leslie L. Fowler, Tucson, Ariz., assignor, by mesne assignments, to Fuller Company, Borough of Catasauqua, Pa., a corporation of Delaware
Filed Sept. 18, 1958, Ser. No. 761,777
5 Claims. (Cl. 210—223)

This invention relates to a conveyor, and more specifically to a device of this general type which is flexible and adaptable to varying dimensional limitations. The device is useful for various purposes. It can be fitted with magnets and be used for magnetic cleaning of wastes, such as coolant and cutting oils; or, by leaving the magnets away, the device may serve as a conveyor for sludge, chips or materials in powder form. By suitably controlling its speed, the conveyor can be used for feeding materials, such as water treating chemicals, in definite amounts during predetermined periods of time.

It is an object of this invention to provide an improved magnetic separator and conveyor which is simple and economical in construction.

Another object is to provide an efficient conveyor for sludge, chips and powdered materials.

Another object is to provide a material handling conveyor and feeder which is capable of feeding regulated quantities of material within predetermined periods of time.

Another object is to provide a device of the type described which is adaptable to widely varying dimensional requirements.

Another object is to provide a device of this general type which permits the elevation of inlets and outlets to be shifted to conform to the requirements of individual installations.

Another object is a magnetic separator and conveyor which is adaptable to installation inside or outside machine bases, sumps, or tanks.

Another object is a magnetic separator and conveyor which separates both magnetic and non-magnetic solids from a contaminated liquid and conveys them to a point of disposal.

Another object is a device of the general type described which conveys around bends and at varying levels and angles without creating an excessive frictional load.

Other objects of the invention will become apparent from consideration of the description and of the claims which follow.

Briefly, the conveyor comprises a motor driven rotatable, flexible coil or spiral in a tube. When the device is used for magnetic separation as well as conveying, magnets are mounted around a portion of the outer periphery of the tube, and the coil is made of non-magnetic material, such as non-magnetic stainless steel, and the tube of a non-magnetic material such as hardened copper, brass, plastic, stainless steel and the like. When the device is used in conveying of sludge, chips or powdered materials, the coil can be of any flexible material capable of withstanding the required torque, such as for example, hardened steel or stainless steel, and any suitable abrasion resisting material, such as carbon steel tubing may be used for the tube in this case. Any source of magnetic power capable of forming a strong and continuous magnetic field throughout the non-magnetic tube through which the contaminated liquid must flow may be utilized for the magnetic separator; preferably, however, ceramic permanent magnets, such as sold under the trade name Indox by The Indiana Steel Products Co. of Valparaiso, Indiana, are used. A protective cover is formed about the entire assembly in any suitable manner, as by dipping, wrapping or casting.

The invention will be more readily understood by reference to the drawings which form a part hereof, and wherein similar elements in the several drawings are designated by the same reference characters.

FIGURE 1 is a front elevation, partly in section, of a magnetic separator and conveyor according to the invention, with the cover partly broken away;

FIGURE 2 is a partial plan view of the embodiment of FIGURE 1;

FIGURE 3 is an enlarged vertical cross-sectional view along line 3—3 of FIGURE 1 with the cover removed;

FIGURE 4 is an enlarged vertical cross-sectional view along line 4—4 of FIGURE 1, with the cover and the conveyor coil removed; and FIGURE 5 is an elevation, partly broken away, of a conveyor-feeder according to the invention.

FIGURE 1 shows for purposes of exemplification and illustration and arrangement where the inlet portion of the separator-conveyor 10 is installed directly underneath a hopper or trough 11 which may receive contaminated liquid, such as coolant or cutting oil, from a machine or a storage tank, or may itself serve as a storage tank for such liquids. As best shown in FIGURE 2, the hopper 11 has inwardly sloping side walls 13 and 14, and is flanged to an inlet port structure 16 through which it discharges into the tube 20 of the separator-conveyor. It will be obvious that instead of being connected directly to a machine hopper or trough, as shown in FIGURE 1, the tube 20 may receive contaminated liquid through any suitable pipe connection leading from a source of contaminated liquid. The inlet port structure 16 may be of standardized design and a plate with a port suitable for the particular installation, for example for connection to a pipe, can be flanged or coupled to it.

The tube 20 has a clean liquid outlet 21 near one end and an outlet 22 for discharge of material separated from the liquid from its other end, and is supported by legs 23. The tube may be made in any desired shape, such as straight, or curved, as shown. Preferably the tube 20 is made in sections which are connected together by standard flanges or couplings. This permits using standardized sections. For example, a straight middle section, such as 20a, may be provided, and curved sections, such as 20b and 20c, be flanged to both ends thereof. Further straight and curved sections of standard design, such as 20d and 20e, respectively, may be used as required for a desired elevation of discharge of swarf or sludge and of treated liquid. It will be obvious that a relatively small number of standardized sections will permit to use a great variety of shapes of the conveyor to conform to varying dimensional requirements and will also permit directional changes for flexibility of the installation. For example, by turning sections 20c and 20e about 180°, the sludge discharge 22 of the conveyor can be located at a lower elevation. To prevent draining of the liquid from hopper 11, or from a storage tank mounted on the hopper 11, to below a desired level, the clean liquid discharge outlet 21 from the separator-conveyor can be adjusted to an elevation above the level to be maintained.

A coil 30 of non-magnetic material, such as stainless steel, extends through the entire length of the tube 20. Preferably the coil 30 is made of flat-face stock steel wound about a mandrel to form a coil having a slightly smaller diameter than the inside diameter of the tube, to provide sufficient clearance between the tube and the coil, that the coil can be rotated in the tube without direct contact with the inner wall of the tube. One end 30a of the coil 30 is attached, as by a hub or wheel, to the shaft of a motor-reducer 32, whose operation is controlled by a timer 33. The other end 30b of the coil 30 may be flush with the end of tube 20 or may extend a slight distance beyond the end of the tube, as shown in FIGURE 1. A material receiving device, such as tank 35, is provided below the free or discharge end 30b of coil 30. The coil 30 is sufficiently flexible to convey solids around the bends of the tube 20 without creating undue frictional losses.

To provide an intense continuous magnetic field throughout the portions of the non-magnetic tube 20 through which the contaminated liquid flows from the inlet port 16 to the clean liquid outlet 21, magnets 40 are arranged about the periphery of these portions, with their north and south poles aligned as shown in FIGURES 3 and 4. Preferably the flat ceramic magnets shown in the drawing for purposes of illustration are used. However, horseshoe magnets can be used, and with large conveyors the use of electromagnets is contemplated. Magnets may also be mounted about the periphery of sections 20c, 20d and 20e of the tube 20, to hold the swarf to the tube, as the coil moves it upwardly to the discharge outlet 22. I have found, however, that magnets about these sections are not required and that the flat spirals of the coil prevent any downward escape of separated material.

As best shown in FIGURES 3 and 4, a shunt plate 42, preferably of soft iron, surrounds the outer surface of the magnets to confine the magnetic energy to within the tube 20. The entire magnet-shunt assembly is held to the tube 20 by bands 43 whose ends are clamped together, as shown. FIGURE 3 shows the arrangement of the magnets on the straight section 20a of the tube. As shown in FIGURE 1, a continuous shunt 42 is provided on the straight section. FIGURE 4 shows the arrangement of the magnets on curved section 20b of the tube. Only two magnets are mounted about the periphery of the curved section, and individual shunts 42 are provided for each pair of magnets, as shown in FIGURE 1.

The magnets are preferably protected against damage and accidental shunting by a sheath or cover 50, which can be formed in any suitable manner. For example, the spaces between the magnets can be filled with any non-magnetic mastic and the assembly then be dipped in plastic material, such as polyvinyl chloride, to form a smooth protective surface; or a suitable pliable material, such as fabric reinforced neoprene, may be wound around the assembly; alternatively, a non-magnetic cast metal cover or a molded plastic cover can be provided.

In operation of the magnetic separator and conveyor, contaminated liquid normally enters the separator through a hopper, such as the V-bottom hopper 11, into which the magnetic and non-magnetic particles settle, and through the inlet port 16. However, instead of directly underlying the hopper, the inlet port 16 may be connected by a conduit to a storage container or to a machine sump or the like. The flexible coil 30 is rotated by the motor-reducer 32, preferably intermittently, the timer 33 being set to operate the motor-reducer 32 at intervals sufficient to keep the tube 20 clean, such as, for example, one minute out of every two minutes. Settleable solids, both ferrous and non-ferrous, are picked up by the conveyor coil 30 and are moved to the material outlet 22 and drop into the sludge receiving tank 35 from which they may be withdrawn by any suitable means, not shown, to a point of disposal. The liquid passes up the tubular conveyor to the clean liquid outlet 21. From the point of its entry into the conveyor to near the point of its discharge, the liquid is subjected to the intense magnetic field created by the magnets 40 surrounding the lower portion of the tube 20, whereby fine non-settleable metal particles are attracted to the inside of the tube and form a layer thereon. Fine non-ferrous particles are entrapped in this layer and are intermixed with the ferrous particles. The rotating coil 30 moves these particles to the material outlet 22. Preferably sufficient clearance is provided between the coil 30 and the inner wall of the tube 20 to leave on the wall a thin coat of particles which protects the tube against abrasion due to direct scraping of its wall by the coil 30. This insures a long life of the tube.

The magnetic separator-conveyor effects a very thorough and efficient separation of magnetic and non-magnetic particles from contaminated liquids, such as cutting oils or coolants, and is readily adaptable to any available space and to direct or indirect connection to machine sumps or storage containers. Due to the flexibility of the coil 30 the solids can be conveyed around the bends of the tube 20 without creating undue friction.

The usefulness of the new conveyor extends beyond magnetic separation. The flexible spiral conveyor has been successfully used for conveying chips, for example of cork, sludge and materials in powder form, such as lime. When fed with constant quantities of materials the conveyor discharges a definite weight of material in a definite period of time. This makes the conveyor not only suitable for moving materials from one location and elevation to another, but permits its use for proportional feeding of chemicals, such as water treating chemicals.

When using the device for conveying or chemical feeding, the magnets 40, shunts 42 and cover 50, as well as the clean liquid outlet 21 and the parts of the tube 20 and coil 30 leading to it can be left away and the motor-reducer be affixed to the coil at a point adjacent the inlet port 16.

To obtain proportional feeding, a variable speed motor may be used and its speed of rotation be controlled from the flow rate of the liquid to which the chemical is to be fed, as is well known in the art. Alternatively, intermittent feeding may be resorted to and the portion of each operating cycle of predetermined length during which the motor rotates the coil 30 may be controlled in known manner by electric or pneumatic impulses or otherwise, to obtain proportional feeding.

Rotation of the coil 30 below the open bottom of hopper 11 effects an upheaving of the material in the hopper 11 and agitation at the plane of the hopper outlet, which prevents compacting of the material and arching, to which certain materials, such as lime, have a tendency.

Under an overload the diameter of the spiral 30 becomes smaller and the spiral expands longitudinally until the overload has been removed, whereupon the spiral returns to its normal shape.

FIGURE 5 shows an embodiment of the invention which is particularly suited to material conveying and feeding. In this embodiment the coil $30_1$ extends through the material hopper or container $11_1$ and is affixed with one end to a motor-reducer $32_1$, which is mounted on a suitable support 55 affixed to the hopper $11_1$, as shown. Outside the hopper $11_1$ the coil $30_1$ is surrounded by a tube $20_1$ of suitable length and configuration, which may be supported in any suitable manner, as from the support frame 56 of the hopper $11_1$ and by a supplemental leg or legs $23_1$, as shown. As in the embodiment of FIGURE 1, the tube $20_1$ may be made in sections, if desired. The free end of the coil $30_1$ may be flush with the corresponding end of tube $20_1$ or extend slightly beyond it, as shown.

Rotation of the coil $30_1$ inside the hopper $11_1$ effects agitation of the material in the hopper and prevents its compaction. When the coil $30_1$ is rotated, the portion inside the hopper $11_1$ is free to assume different shapes and may be displaced laterally, or may partly contract and partly expand due to different resistances to its rotation by the material in the hopper. Such variations in the shape of the coil are desirable as they prevent undue stresses in the coil and make for good agitation of the material.

If more agitation is required than is afforded by rotation of the coil $30_1$ within the hopper, then plows 57 of suitable shape may be affixed to those spirals of coil $30_1$ which overlie the outlet of hopper $11_1$, to break up any arch of material which may form in that neighborhood.

It will be seen that in its simplest form the invention provides an efficient material conveyor and feeder of economical construction which is automatic in operation and adaptable to space limitations.

It will be obvious to those skilled in the art that the invention is not limited to the exact construction of the embodiment shown and described for purposes of illustration and exemplification, but that various changes may be made without departing from the spirit and scope of the invention.

I claim:

1. Apparatus for separating magnetic and non-magnetic solids jointly from liquid wastes, such as coolants and cutting oils, comprising a tube of non-magnetic material having an inlet port through which the liquid waste enters the tube from a source of such waste, clean liquid outlet means from said tube, discharge means for solids separated from said liquid from a portion of said tube functionally remote from said clean liquid outlet means, a flexible coil of non-magnetic material in said tube and extending at least from said clean liquid outlet means to said solids discharge means and having a free end adjacent said solids discharge means, means for rotating said coil connected to the other end of said coil, and means establishing a magnetic field in said tube to attract non-settable magnetic solids to the inner wall of said tube to form a layer thereon wherein non-settable non-magnetic solids are entrapped, said coil, upon its rotation, jointly conveying any coarse magnetic and non-magnetic solids settled in said tube and the fine magnetic solids attracted by said magnetic field with entrapped fine non-magnetic solids to said solids discharge means.

2. Apparatus for separating magnetic and non-magnetic solids jointly from liquid wastes, such as coolants and cutting oils, comprising a tube of non-magnetic material having inlet means through which the waste enters the tube from a source of such waste, outlet means for clean liquid, and discharge means for solids separated from said liquid wastes, said inlet means being located between said clean liquid outlet means and said solids discharge means, and said clean liquid outlet means and said solids discharge means leading from opposed end portions of said tube, a flexible coil of non-magnetic material in said tube and extending at least from said clean liquid outlet means to said solids discharge means, said coil being flexible over its entire length and having a free end adjacent said solids discharge means, whereby it can expand under load to extend beyond said discharge means, motor means for rotating said coil in said tube and connected to the other end of said coil, and magnets mounted on the outside of said tube between said inlet port and said clean liquid outlet means, with their opposite poles in facing relation, said magnets establishing a magnetic field in said tube whereby magnetic solids are attracted to and form a layer on the inner wall of said tube in which layer non-settable non-magnetic solids are entrapped, said coil being adapted upon its rotation, to jointly move solids attracted to the inner wall of said tube by the magnetic field set up by said magnets and non-magnetic solids intermeshed therewith, as well as any magnetic and non-magnetic solids settled in said tube along said tube to said solids discharge means.

3. The apparatus of claim 2 including also soft iron shunt means about said magnets.

4. Apparatus for separating magnetic and non-magnetic solids jointly from liquid wastes, such as coolants and cutting oils, comprising a sectional tube of non-magnetic rigid material including a plurality of tube sections of different shape adapted to be connected together in selective sequence and direction, whereby said tube can be given different configurations, said tube having clean liquid outlet means, discharge means for solids separated from said liquid functionally remote from said clean liquid outlet means, and inlet means for the contaminated liquid to be cleaned intermediate said clean liquid outlet and solids discharge means, a flexible coil extending in said tube, said coil being made of flat non-magnetic material wound into a spiral, and having a free end adjacent said solids discharge means and its other end near said clean liquid outlet means, means establishing a magnetic field in said tube of sufficient strength to attract magnetic solids to the inner wall of said tube to form on said inner wall a layer of such magnetic solids wherein nonmagnetic solids are intermeshed, and power means connected to said other end and adapted to intermittently rotate said coil to move magnetic solids attracted to said wall and non-magnetic solids intermeshed therewith to said discharge means, said coil, under overload, expanding longitudinally, whereby its diameter becomes smaller, and returning to its normal shape under normal load conditions.

5. A magnetic separator and conveyor for cleaning a contaminated liquid waste, comprising a tube of non-magnetic material having an inlet port for the contaminated liquid, clean liquid outlet means at a higher elevation than said inlet port, and discharge means for solids separated from said liquid functionally remote from said clean liquid outlet means, a coil of non-magnetic material extending in said tube, means for rotating said coil connected to one end of said coil, said coil being sufficiently flexible over its entire length to expand under load and having a free end adjacent said solids discharge means, and means establishing a magnetic field in said tube to attract magnetic particles to the inner wall of said tube, said coil, upon its rotation, conveying solids attracted to the inner wall of said tube and any magnetic and non-magnetic solids deposited in said tube by gravity jointly to said solids discharge means.

References Cited in the file of this patent

UNITED STATES PATENTS

| | | |
|---|---|---|
| 1,741,981 | Dewey et al. | Dec. 31, 1929 |
| 1,757,341 | Smit | May 6, 1930 |
| 2,002,978 | Davis | May 28, 1935 |
| 2,045,757 | Constantin | June 30, 1936 |
| 2,121,462 | Winterlich | June 21, 1938 |

UNITED STATES PATENT OFFICE
CERTIFICATE OF CORRECTION

Patent No. 3,121,683                      February 18, 1964

Leslie L. Fowler

It is hereby certified that error appears in the above numbered patent requiring correction and that the said Letters Patent should read as corrected below.

Column 2, line 18, for "and" read -- an --; column 5, lines 26, 27 and 56, for "non-settable" read -- non-settleable --.

Signed and sealed this 4th day of August 1964.

SEAL)
:test:

RNEST W. SWIDER                               EDWARD J. BRENNER
testing Officer                                   Commissioner of Patents